United States Patent
Minakuchi et al.

(10) Patent No.: US 7,345,675 B1
(45) Date of Patent: Mar. 18, 2008

(54) APPARATUS FOR MANIPULATING AN OBJECT DISPLAYED ON A DISPLAY DEVICE BY USING A TOUCH SCREEN

(75) Inventors: Yu Minakuchi, Kawasaki (JP); Satoshi Okuyama, Kawasaki (JP); Akiko Fukue, Tokyo (JP); Hajime Kamata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/149,216

(22) Filed: Sep. 8, 1998

Related U.S. Application Data

(60) Division of application No. 08/437,563, filed on May 9, 1995, now Pat. No. 5,844,547, which is a continuation of application No. 07/953,101, filed on Sep. 29, 1992, now abandoned.

(30) Foreign Application Priority Data

Oct. 7, 1991 (JP) .................................. 3-258232

(51) Int. Cl.
G09G 5/00 (2006.01)
G06F 3/041 (2006.01)
G06F 3/048 (2006.01)

(52) U.S. Cl. ...................... 345/173; 345/156; 715/773; 715/863

(58) Field of Classification Search ................ 345/173, 345/127, 341, 339; 395/800
See application file for complete search history.

(56) References Cited

U.S. PATENT DOCUMENTS

| | | | |
|---|---|---|---|
| 4,903,012 A | * | 2/1990 | Ohuchi ........................ 345/173 |
| 4,914,624 A | * | 4/1990 | Dunthon ...................... 364/900 |
| 4,947,156 A | * | 8/1990 | Sato et al. ................... 345/173 |
| 4,954,967 A | | 9/1990 | Takahashi |

(Continued)

FOREIGN PATENT DOCUMENTS

EP  0 279 652  8/1988

(Continued)

OTHER PUBLICATIONS

"Virtual Integrated Mouse" IBM Technical Disclosure Bulletin, vol. 30, No. 10, Mar. 1988, pp. 398-401, XP002129895 IBM Corp. New York, US.

(Continued)

*Primary Examiner*—Richard Hjerpe
*Assistant Examiner*—M. Fatahiyar
(74) *Attorney, Agent, or Firm*—Staas & Halsey LLP

(57) ABSTRACT

Apparatus and a method of operation manipulates the display of an object on the display surface of a display device in accordance with sensing touching contact on a touch panel, superimposed on the display surface and simulating movement of the displayed object in accordance with the characteristics of the touching contact on the touch panel adjacent to the displayed object image. Further, object data defining the display of the object image for each of a plurality of different states of the object, display information specifying the shape and physical properties of the object and the current display position thereof and file information relating to the stored data are stored and accessed for interpreting the simulated manipulation of the object by the characteristics of the touching contact therewith, for correspondingly manipulating and displaying the thus manipulated object image.

60 Claims, 11 Drawing Sheets

U.S. PATENT DOCUMENTS

| | | | | |
|---|---|---|---|---|
| 5,060,135 A | * | 10/1991 | Levine et al. | 364/200 |
| 5,347,628 A | | 9/1994 | Brewer et al. | |
| 5,596,346 A | * | 1/1997 | Leone et al. | 345/127 |
| 5,615,384 A | * | 3/1997 | Allard et al. | 395/800 |
| 5,867,158 A | * | 2/1999 | Murasaki et al. | 345/341 |
| 5,953,008 A | * | 9/1999 | Hagiuda | 345/339 |

FOREIGN PATENT DOCUMENTS

| | | |
|---|---|---|
| EP | 0 279 652 A2 | 8/1988 |
| EP | 0 314 395 | 5/1989 |
| EP | 0 314 395 A1 | 5/1989 |
| EP | 0 179 147 | 9/1989 |
| EP | 0 404 373 | 12/1990 |
| EP | 0 448 496 | 9/1991 |
| EP | 0 448 496 A2 | 9/1991 |
| JP | 62-150477 | 7/1987 |
| JP | 63-206827 | 8/1988 |
| JP | 1-314321 | 12/1999 |
| WO | WO 85-05201 | 11/1985 |

OTHER PUBLICATIONS

"Virtual Integrated Disclosure Bulletin," IBM Technical Disclosure Bulletin, vol. 30, No. 10, pp. 398-401, XP-002129895, Mar. 1988, U.S.

Extended European Search Report dated May 4, 2006 for European Patent Application No. 06027103.0.

Patent Abstracts of Japan, vol. 012, No. 497 (P-806), Dec. 26, 1988 & JP 63 206827 A., Aug. 26, 1988.

\* cited by examiner

FIG. 4(a)

| OBJECT TYPE | DISPLAY POSITION INFORMATION ||||| FILE INFORMATION |||||
|---|---|---|---|---|---|---|---|---|---|---|
| | TOP-LEFT COORD || SIZE || ANGLE | TOTAL SIZE || DISPLAY POSITION || NORMAL DISPLAY FILE NAME | SPECIAL STATE FILE NAME |
| | X | Y | W | H | | W | H | X | Y | | |
| | | | | | | | | | | | |
| | | | | | | | | | | | |

| | X-COORD (4 BYTES) | X-COORD (4 BYTES) | PRESSURE (4 BYTES) |
|---|---|---|---|

2I

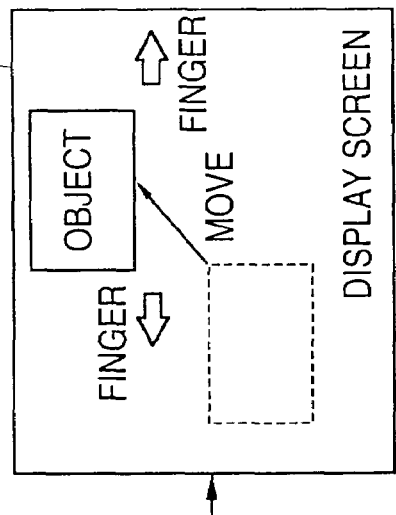
FIG. 6(a)
FIG. 6(b)
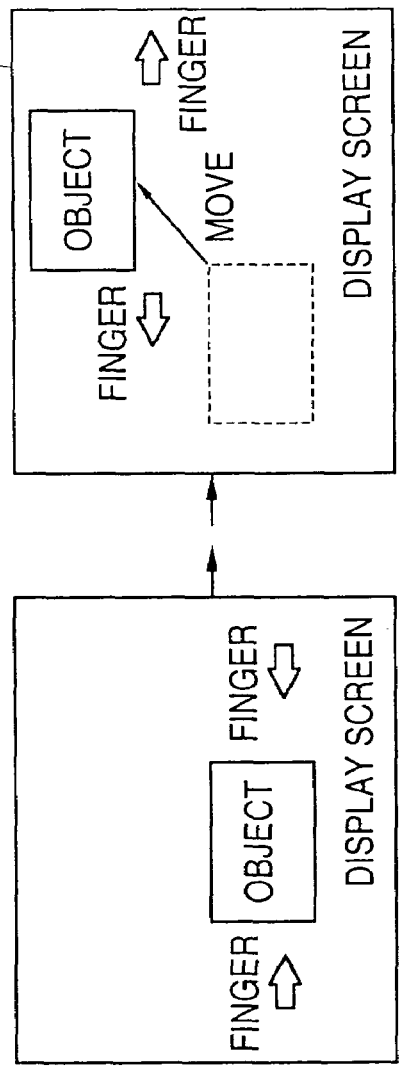
FIG. 6(c)

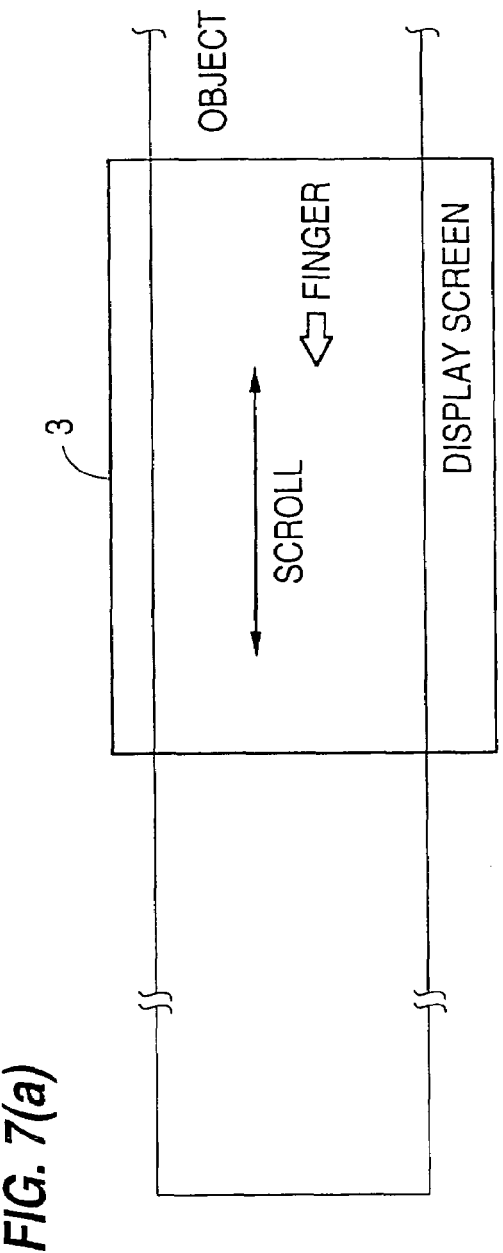

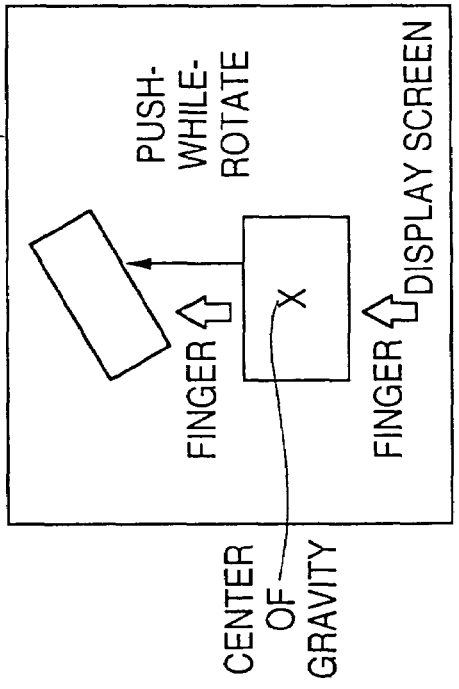
*FIG. 8(a)*
*FIG. 8(b)*
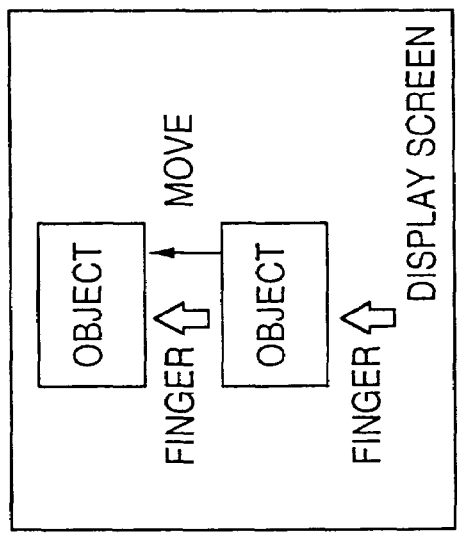
*FIG. 8(c)*

*FIG. 9(a)*
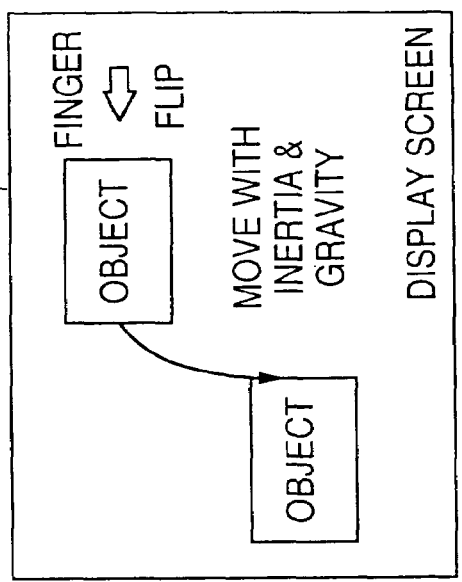
*FIG. 9(b)*
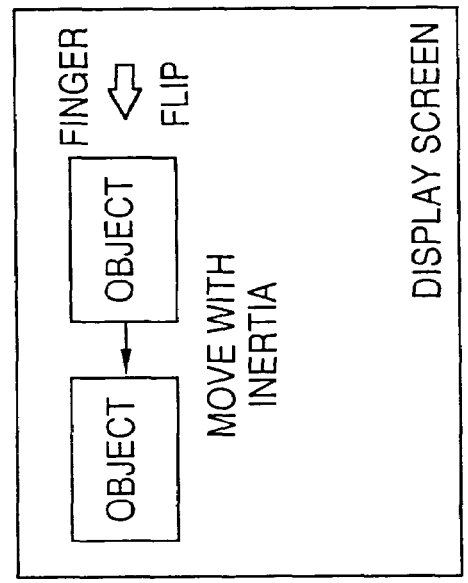
*FIG. 9(c)*
| OBJECT TYPE | DISPLAY POSITION INFORMATION | | | | | FILE INFORMATION | | | | | |
|---|---|---|---|---|---|---|---|---|---|---|---|
| | TOP-LEFT COORD | | SIZE | | ANGLE | TOTAL SIZE | | DISPLAY POSITION | | NORMAL DISPLAY FILE NAME | SPECIAL STATE FILE NAME |
| | X | Y | W | H | | W | H | X | Y | | |
| NORMAL | 500 | 100 | 200 | 400 | 0 | — | — | — | — | OBJ3 | — |

| OBJECT TYPE | DISPLAY POSITION INFORMATION ||||| FILE INFORMATION ||||| NORMAL DISPLAY FILE NAME | SPECIAL STATE FILE NAME |
| | TOP-LEFT COORD || SIZE || ANGLE | TOTAL SIZE || DISPLAY POSITION || | |
| | X | Y | W | H | | W | H | X | Y | | |
| ROLL-ABLE | 50 | 100 | 400 | 500 | 0 | — | — | — | — | OBJ4 | |

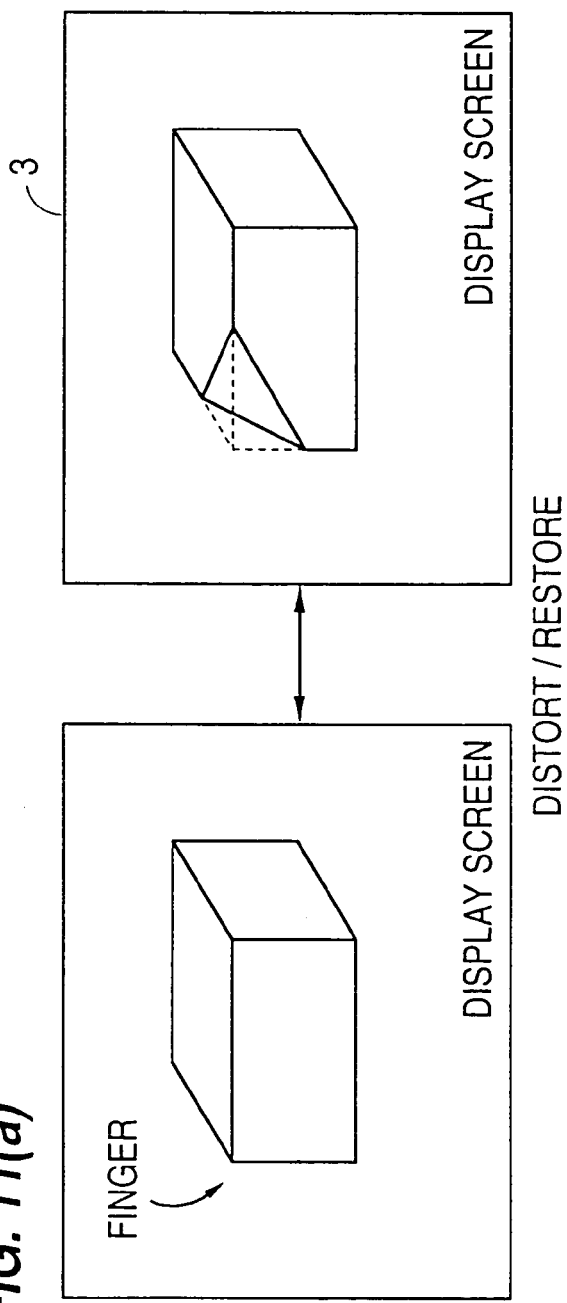

APPARATUS FOR MANIPULATING AN OBJECT DISPLAYED ON A DISPLAY DEVICE BY USING A TOUCH SCREEN

CROSS-REFERENCE TO RELATED APPLICATIONS

This is a divisional application of prior application Ser. No. 08/437,563 filed May 9, 1995, which is a continuation of application Ser. No. 07/953,101, filed Sep. 29, 1992.

BACKGROUND OF THE INVENTION

1. Field of the Invention

The present invention relates to an apparatus for manipulating an object displayed on a display device by using a touch screen.

As use of computer systems for data processing has become widespread in recent years, more and more users are being required to handle same, i.e., to input data and converse with data processors such as work stations and personal computers. A vast variety of application programs are available for recent data processors and even a complicated application can be processed by using such application programs in combination. However, it is a great problem that such data processors are very difficult to handle, especially to manipulate an object displayed on a display device, for those who have less than a substantial knowledge of computers.

Therefore, an apparatus for manipulating an object displayed on a display device, which is easily handled even for a person who has no special knowledge of computers, is in great demand.

2. Description of the Related Art

FIG. 1 illustrates a computer system with a conventional user interface.

A computer system with a conventional user interface consists mainly of a central processing unit (CPU) 4, a main memory 5, a keyboard/mouse 2, a frame memory 6 and a hard disk interface 71, which are interconnected via a system bus, and also a hard disk 7 and a display unit 3, which are connected to system bus via the hard disk interface and the frame memory 6, respectively. The main memory 5 stores a system control program and application programs which handle graphics processing, and provides a work area for use by the programs. The CPU 4 performs display operations under control of the programs. The hard disk 7 stores a data file for graphics to be displayed on the display unit 3. The frame memory 6 stores a frame of picture (or object) data to be displayed on the display unit 3.

To manipulate an object displayed on a display unit 3 in the above system, an operator is required to input a command, for manipulating the object by using a keyboard/mouse 2, or to select an icon (a symbolic representation of a computer function), displayed on a display unit 3 by using the keyboard/mouse 2, in order to command a desired function. However, it is troublesome and annoying to use a keyboard/mouse and icons and a person with less than a substantial knowledge of computers tends to be reluctant even to touch a keyboard/mouse.

Therefore, it is a great problem that such data processors are very difficult to handle for those who have less than a substantial knowledge of computers.

SUMMARY OF THE INVENTION

It is an object of the present invention to provide an apparatus which can easily manipulate an object displayed on a display unit.

It is another object of the present invention to provide a user interface with which a user can easily manipulate an object displayed on a display unit.

To achieve the above and other objects, the present invention provides a touch screen, a plurality of data files, display information storage means and display control means.

In the apparatus for manipulating an object displayed on a display device, the touch screen, which is a transparent panel and is mounted on the display surface, or screen, of a display device and is sensitive to the touch, e.g., of a finger of a human operator, outputs touch screen information representing the motion of the body. The plurality of data files store object data for displaying the object in different states. The display information storage means stores object information including at least an object type which specifies the shape and physical properties of the object, display position information which specifies a position where the object is displayed on the display device, file information which specifies the size and location of a part of the object data stored in one of said plurality of data files, and a file name which specifies one of said plurality of data files. The display control means recognizes a manipulation to be conducted on the object, based on the touch screen information from the touch screen and on the object information included in the display information storage means, and displays the object on the display device in accordance with the aforesaid recognition.

BRIEF DESCRIPTION OF THE DRAWINGS

FIG. 4(a) is a display information table;

FIG. 4(b) illustrates the format of touch-screen information;

FIGS. 6(a) and 6(b) are related and interconnected diagrams illustrating and FIG. 6(c) is a table explaining a pick manipulation;

FIG. 7(a) is a diagram illustrating and FIG. 7(b) is a table explaining a scroll manipulation;

FIGS. 8(a) and 8(b) are related diagrams illustrating and FIG. 8(c) is a table explaining a push manipulation;

FIGS. 9(a) and 9(b) are related diagrams illustrating and FIG. 9(c) is a table explaining a flip manipulation;

FIG. 11(a) is a diagram illustrating and FIG. 11(b) is a table explaining a distort-restore manipulation.

Throughout the above-mentioned drawings, identical reference numerals are used to designate the same or similar component parts.

DESCRIPTION OF THE PREFERRED EMBODIMENTS

Figure 2:
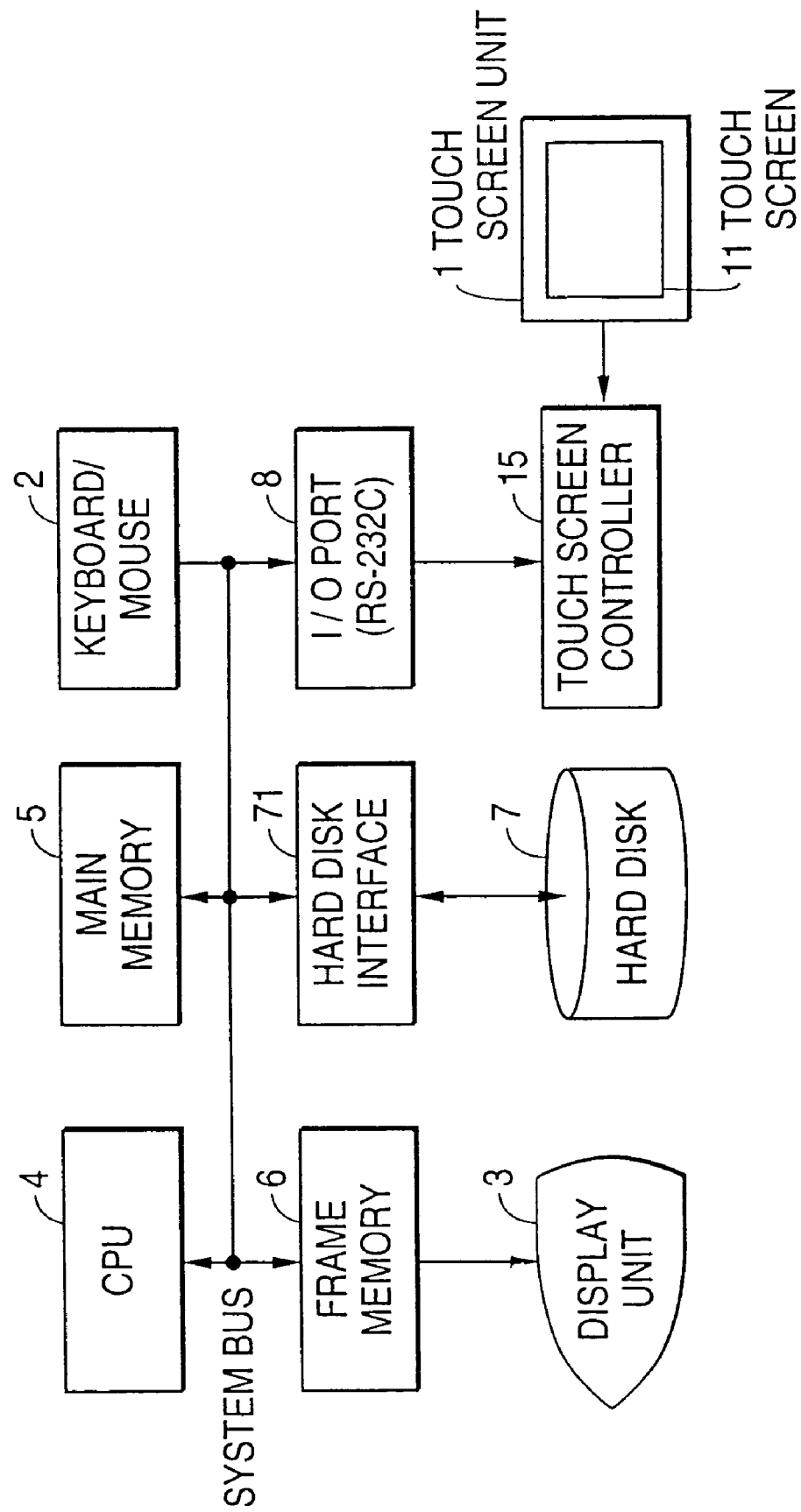
FIG. 2 is a block diagram of the configuration of a touch screen-equipped workstation, in which the present invention is implemented.

FIG. 2 is a block diagram of the configuration of a touch screen-equipped workstation, in which the present invention is implemented.

Figure 1:
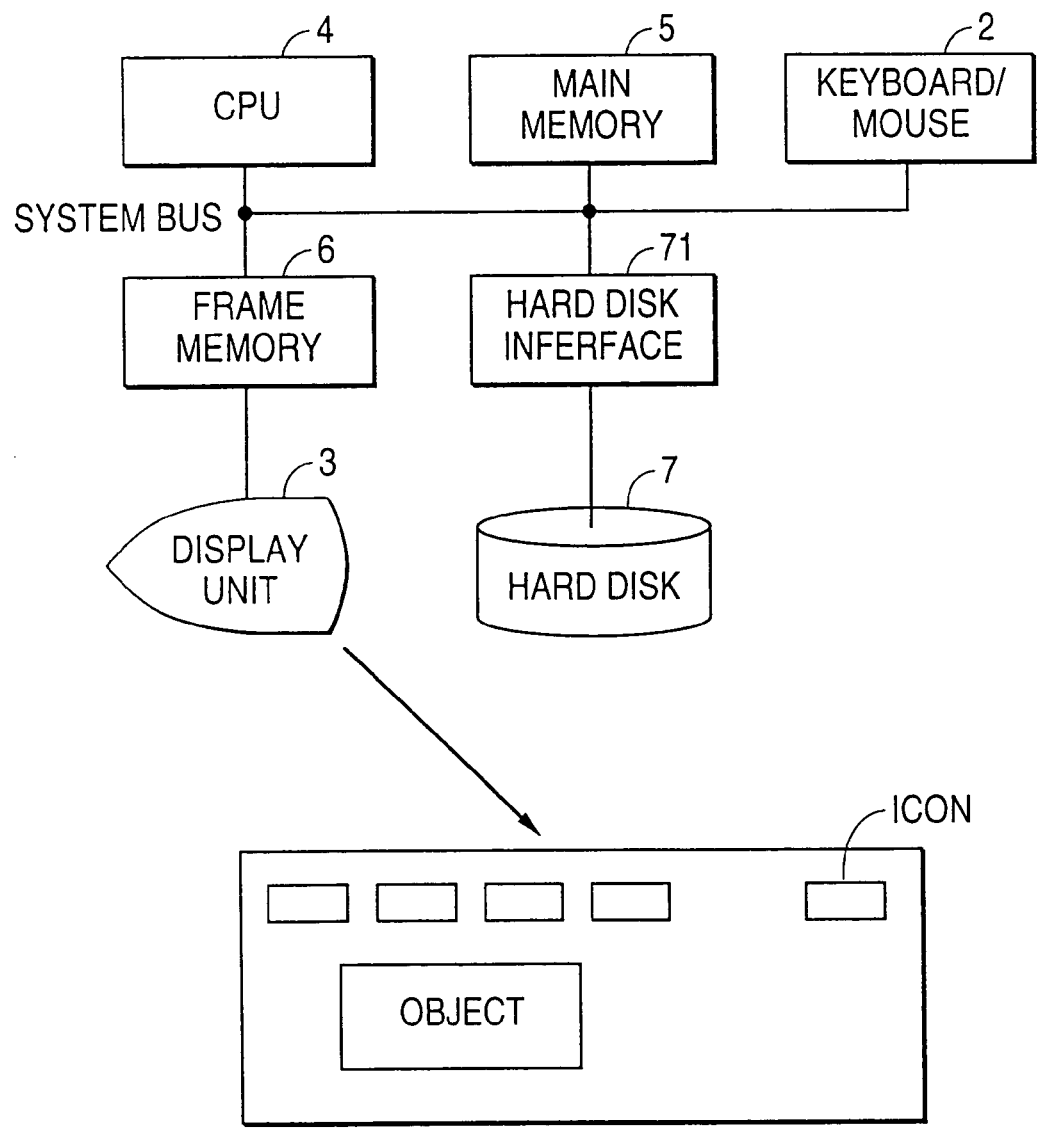
FIG. 1 illustrates a computer system with a conventional user interface.

In addition to the conventional system shown in FIG. 1, the system of FIG. 2, for implementing the present invention, comprises an input-output (abbreviated to I/O) port 8, a touch screen controller 15 and a touch screen unit 1 with a touch screen 11. The touch screen controller 15, connected to the input-output port 8 through an RS-232C interface, controls the touch screen unit 1. The touch screen unit 1, which is sensitive, at a position (defined by X-Y coordinates) at which the touch screen 11 is touched and particularly to the pressure applied thereon when so touched, acts as a user interface that allows a user to send signals to a computer by touching that area thereon with an element, such as the finger, . . . etc.

Figure 3:
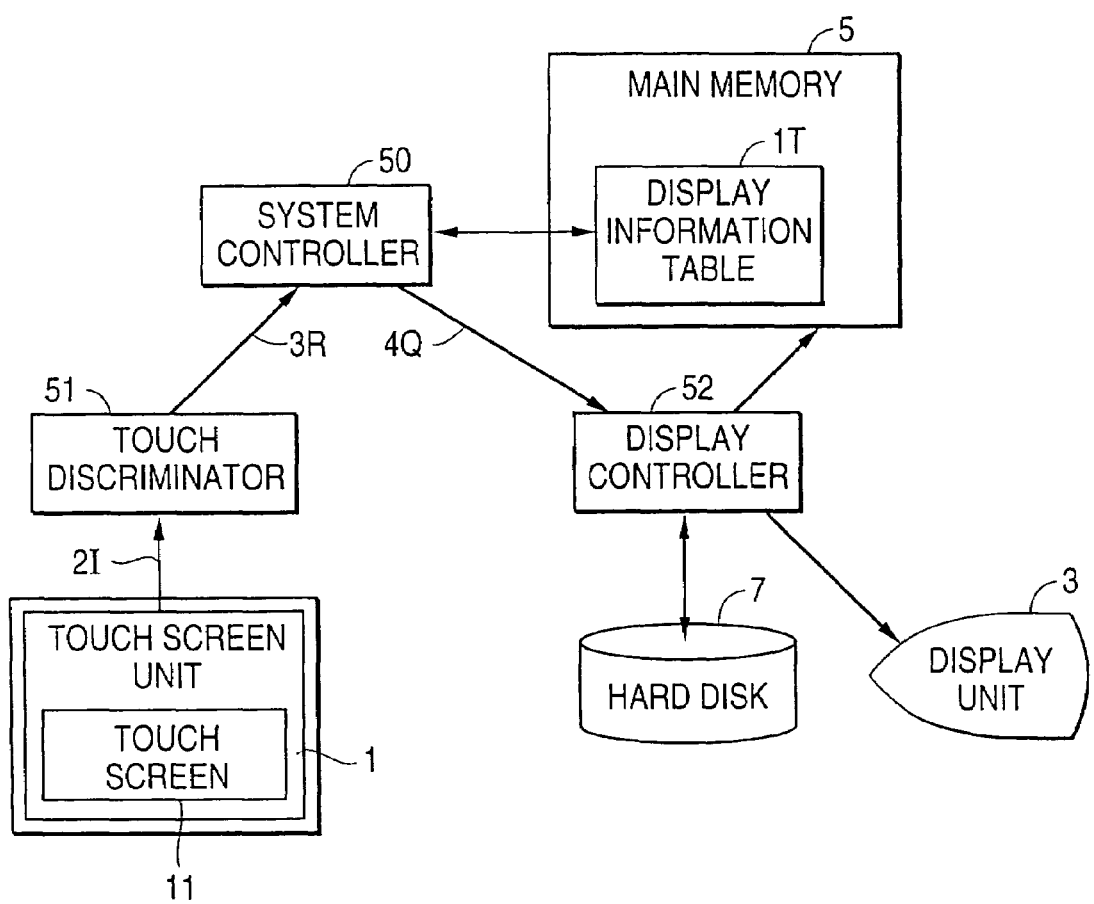
FIG. 3 is a schematic diagram illustrating the principle of the present invention.

FIG. 3 is a schematic diagram illustrating the principle of the present invention.

For easy understanding of the principle, the input-output port 8, touch screen controller 15 and touch screen unit 1 shown in FIG. 2 are represented in FIG. 3, in the composite, by the touch screen unit 1 and the frame memory 6 and display unit 3 and, as before-noted, the touch screen 11 actually is a transparent panel which is mounted on the display surface, or screen, of the display unit 3 but is shown separately therefrom in FIG. 3 of FIG. 2 are represented in FIG. 3, in the composite, by the display unit 3. The hard disk interface 71 and hard disk 7 of FIG. 2 are represented in FIG. 3, in the composite, by the hard disk 7. A system controller 50, a touch discriminator 51, a display controller 52, which are programs stored in the memory 5 and executed by the CPU 4 (or may be constructed by hardware), and a display information table 1T, stored in the main memory 5, control the display operations performed by the present invention.

FIG. 4(a) shows a display information table; FIG. 4(b) shows touch screen information.

The display information table 1T, which is provided in the main memory 5 and corresponds to objects, includes object type information, display position information, file information, normal-display file name and special-state file name. The object type defines the type, including the shape, properties, circumstances, etc., of the object. The display position information defines the size of the object (width "W" and height "H"), and the position (top-left coordinates X, Y) and the angle at which the object is displayed on the display unit 1. The file information, which is used for an object which is so large in size that it requires scrolling to view the whole object, defines the size (width W, height H) of the whole object relative to the display screen size, and also the position (top-left coordinates X, Y) of the object portion being displayed on the display device, relative to the whole object whose data is stored in the normal display file. The normal-display file name specifies a display data file where object data for displaying a normal state of the object is stored. The special-state file name specifies a display data file where object data for displaying a special data (e.g., turn-over indication of display color, used for selectively displaying an intermediate process step, or stage, in manipulating the object) of the object is stored. The special state can be displayed selectively for each manipulation.

Touch-screen information 2I, which is sent from the touch screen unit 1, includes a touch position (X-Y coordinates) where the touch screen 11 is touched and the pressure applied thereon. The touch-screen information 2I may include two sets of X-Y coordinates shown in FIG. 4(b) depending on the type of touch, one set for a thumb and another for an index finger when the two fingers pick the object on its opposite sides, for example. (1) The touch discriminator 51, based on the touch screen information 2I from the touch screen unit 1, discriminates the type of touch which the operator's finger has on the touch screen 11, that is, a touch type including, e.g., a "continuous touch start" and "continuous touch end" as explained later. The touch discriminator 51 sends, to the system controller 50, the result of the touch discrimination performed thereby as a touch report 3R, which includes touch type and, according to the touch-screen information 2I, one or two sets of touch coordinates.

Based on the touch report 3R from the touch discriminator 51 and the display information table 1T, the system controller 50 determines the type of manipulation which was conducted by the operator and, according to the determination, updates the display information table 1T. Then, the system controller 50 sends, to the display controller 52, a display update request 4Q including "display update data" which reflects the updated contents of the display information table 1T including display position information, filed information and normal display file name and special state file name.

On receipt of the display update request 4Q from the system controller 50, the display controller 52 reads a display data file (including object data), specified by the file name, from the hard disk 7 and stores the data into the main memory 5. The display controller 52 then updates the object data in accordance with the display update data from the system controller 50 and loads the thus-updated object data into the frame memory 6 (FIG. 2) thereby to display the object on the display unit 3 (FIG. 2), as manipulated by the operator on the touch screen unit 1.

Thus, the system of the present invention determines a manipulation to be conducted on the displayed object, based on the touch screen information 2I which results from an operator's touching the touch screen 11 and the display information table 1T (see, FIG. 7(b)) which defines the object's shape, physical properties, display position, etc. The system then displays the object, according to the manipulation as thus determined and as intended by the operator, on the display unit 3.

(2) Pick Manipulation (See FIGS. 5 and 6(a) to 6(c)).

A pick manipulation is conducted in such a way that an object is picked up at a position on the display surface of the display unit 3 and placed at another position thereon.

Figure 5:
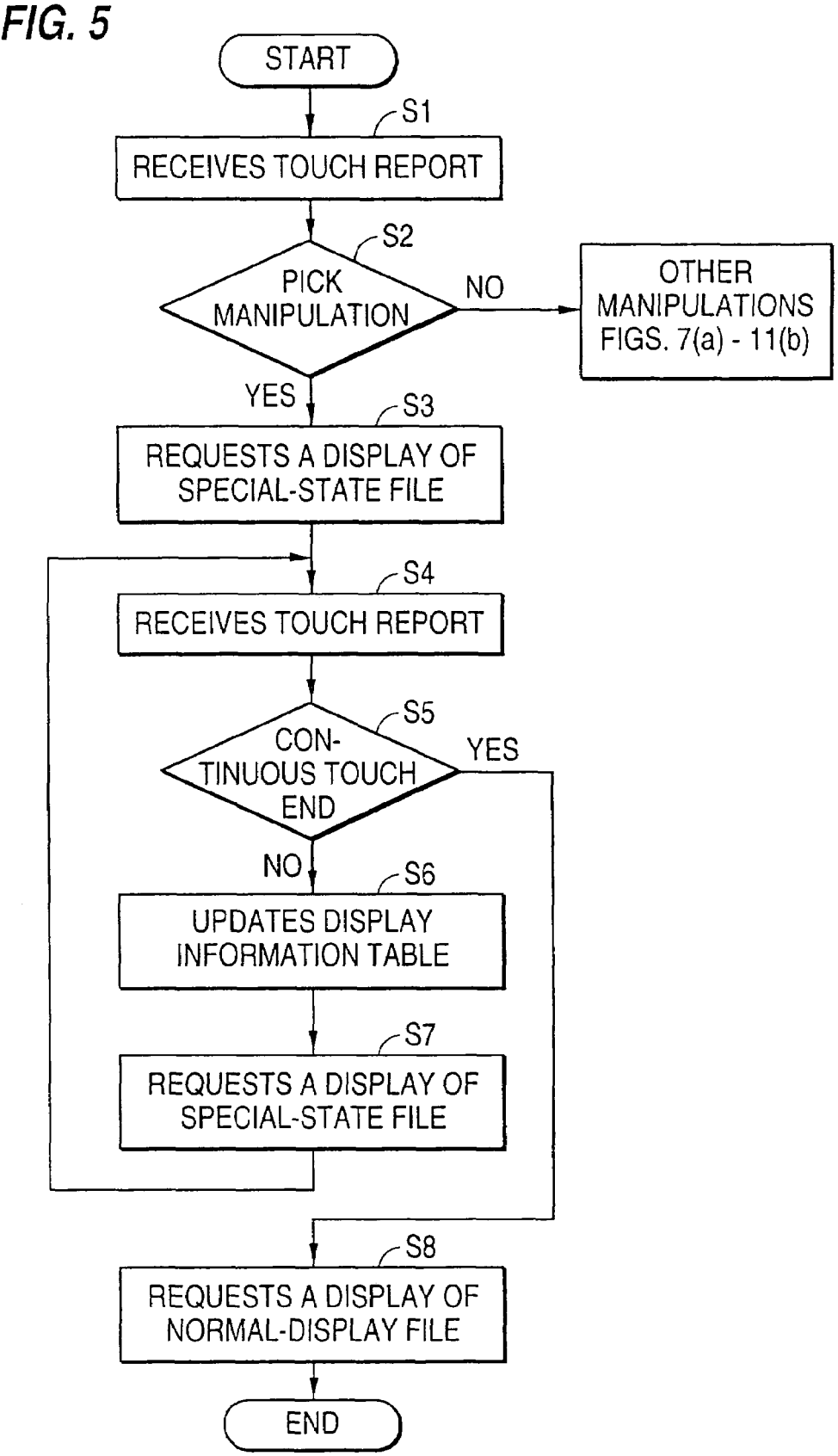
FIG. 5 is a flowchart illustrating a pick manipulation.

FIG. 5 is a flowchart illustrating a pick manipulation.

FIGS. 6(a) and 6(b) are related and interconnected diagrams illustrating, and FIG. 6(c) is a table explaining, a pick manipulation.

A pick manipulation is carried out according to the following steps (S1-S8) in FIG. 5:

(S1) The system controller 50 receives a touch report 3R including two sets of touch coordinates, from the touch discriminator 51.

(S2) The system controller 50 (FIG. 3) checks whether the object-finger relation is a pick manipulation, as shown in FIG. 6(a), based on the touch report 3R and contents of the display information table 1T shown in FIG. 6(c). When the relation is not a pick manipulation, the system controller 50 checks the touch report 3R for other possible manipulations.

(S3) When the relation is a pick manipulation, the system controller 50 sends a display update request 4Q including "display update data", commanding that the special-state file (turn-over indication) be displayed at the position specified by the display information table 1T.

(S4) The system controller 50 receives a touch report 3R.

(S5) The system controller 50 determines whether the touch report 3R includes a "continuous touch end", which occurs when the finger-object relation is as shown in FIG. 6(b). When a "continuous touch end" is reported, the operation goes to step (S8).

(S6) Otherwise, the system controller 50 updates the display position information "coordinates (X, Y)" of the display information table 1T so that the object is positioned between the two fingers of the operator.

(S7) The system controller 50 sends display update request 4Q to the display controller 52, commanding that the special-state file be displayed according to the display information table 1T, as updated, and returns to step (S4).

(S8) When "continuous touch end" is reported by a touch report 3R, the system controller 50 sends a display update request 4Q to the display controller 52, commanding that the normal-display file be displayed at the position specified in the display information table 1T.

The following manipulations are carried out in the same way as descried in the above flowchart of the pick manipulation.

(3) Scroll Manipulation (See FIGS. 7(a) and 7(b)).

A scroll manipulation is conducted in such a way that an object, extending outside of the display surface of the display unit 3, is moved into and out of the display surface.

FIG. 7(a) is a diagram illustrating, and FIG. 7(b) is a table explaining, a scroll manipulation.

On determining that the operator's finger moves while touching the touch screen 11, based on the touch screen information 2I from the touch screen unit 1, the discriminator 51 sends, to the system controller 50, a touch report 3R as previously discussed including, e.g., "continuous touch start" for the "touch type" and also, e.g., "coordinates (800, 800)" for the touch position. As another touch screen information 2I comes in, the discriminator 51 sends a touch report 3R including, e.g., "continuous touch in progress" and "coordinates (780, 800)" (i.e., the movement to the left by the finger as shown in FIG. 7(a), and thus from X=800 to X=780 while at a fixed Y=800). When the touch screen information 2I is not sent for more than 100 milliseconds, for example, the discriminator 51 sends a touch report 3R including "continuous touch end" and, e.g., "coordinates (700, 800)" (i.e., the final X,Y coordinate as of the "touch end") to the system controller 50.

When a "continuous touch start" is reported and the "object type" is defined as "out-screen" in the display information table 1T as shown in FIG. 7(b), the system controller 50 recognizes the manipulation as a scroll and the object as a large one extending beyond the display screen. Then, the system controller 50 determines the speed at which the finger has moved from right to left, for example, based on a change in the X-coordinate in terms of data, between a touch report 3R and the following one.

Depending on whether the finger has moved at a speed of more (high-speed) or less (normal-speed) than 20 dots, for example, the object display position on the display screen is scrolled initially at corresponding intervals of 100 or 500 milliseconds, respectively. Then, the interval, at which the display update request 4Q is sent to the display controller 52, is increased by a factor of 1.5 at each touch report 3R and, when the interval reaches 2 seconds, the scrolling is stopped.

Practically, the display position area of the screen is so controlled that it starts scrolling at the appropriate speed, as above-mentioned, after the operator's finger has moved a distance of 4 dots or more. That is, on recognizing that the finger has moved by that distance, the system controller 50 updates the file information "display position X" of the display information table 1T so that the object is displayed, shifted to the left by 10 dots, for example. The, it sends, to the display controller 52, a display update request including display position information, file information and normal display file name from the display information table 1T, as updated.

The display controller 52 reads from the hard disk 7 a display file specified by the normal display file name and loads it in the main memory 5. The display controller 52 then transfers only the part of the display file, as specified by the file information "display position X" of the display information table 1T, from the main memory 5 to the appropriate location of the frame memory 6.

In the same way, the system controller 50 sends a display update request 4Q to the display controller 52 every time it receives a touch report 3R.

When another "continuous touch" is reported before the scroll currently in progress comes to a stop, a new scroll can start from this point and at the first speed described above.

(4) Scroll-Stop Manipulation (See FIGS. 7(a) and 7(b)).

FIG. 7(a) is a diagram illustrating, and FIG. 7(b) is a table explaining, a scroll manipulation.

When a touch position given by a touch report 3R is the same as or up to approximately 5 dots apart from the position of the scrolling currently in progress, the system controller 50 doubles the frequency with which display update request 4Q are sent to the display controller 52, in order to put an end to the scrolling.

(5) Push Manipulation (See FIGS. 8(a) to 8(c)).

A push manipulation is conducted in such a way that an object is pushed on the display surface of the display unit 3.

FIG. 8(a) is a diagram illustrating, and FIG. 8(c) is a table explaining, a push manipulation.

The system controller 50 determines the type of a manipulation, based on the touch report 3R and contents of the display information table 1T shown in FIG. 8(c). When the manipulation is a push manipulation as shown in FIG. 8(a), the system controller 50 sends, to the display controller 52, a display update request 4Q including display position information, file information and normal display file name so that the object is displayed close to the finger position reported by the touch report 3R. The above display operation is repeated until a "continuous touch end" is reported by a touch report 3R.

(6) Push-While-Rotate Manipulation (See FIGS. 8(b) and 8(c)).

A push-while-rotate manipulation is conducted in such a way that an object is pushed at a position off its center (or the center of gravity shown as X in FIG. 8(b)) and it moves rotating on the display surface of the display unit 3.

The system controller 50 determines the type of a manipulation, based on the touch report 3R and contents of the display information table 1T shown in FIG. 8(c). When the manipulation is a push-while-rotate manipulation as shown in FIG. 8(b), the system controller 50 sends, to the display controller 52, display update requests 4Q with the angle of rotation increasing by 2 degrees, i.e., while increasing the angle in the display information table 1T shown in FIG. 8(c).

The display controller 52 reads the display file from the hard disk and loads the data in the main memory 5, rotates the object by the specified angle and with the left-top coordinates (X, Y) as a rotational center, as specified by the display update request 4Q, and transfers the data, with the object rotated, from the main memory 5 to the frame memory 6.

(7) Flip Manipulation (See FIGS. 9(a) to 9(c)).

A flip manipulation is conducted in such a way that an operator's finger flips an object or touches (i.e., impacts) the object from a remote position at a high speed on the touch screen 11 with a corresponding result on the display surface of the display unit 3.

FIG. 9(a) is a diagram illustrating, and FIG. 9(c) is a table explaining, a flip manipulation.

When a touch report 3R is input from the touch discriminator 51, the system controller 50 discriminates the type of the manipulation, based on the touch report 3R and the contents of the display information table 1T shown in FIG. 9(c). When the manipulation is a flip manipulation as shown in FIG. 9(a), the system controller 50 obtains the finger speed based on the touch report 3R and also obtain the object speed (i.e., the respective intervals at which display update requests 4Q are sent to the display controller 52), in the same way as described in item (3). The system controller 50 sends display update requests 4Q to the display controller 52, while updating the display position information left-top coordinates (X, Y) of the display information table 1T so that the object moves in the direction the finger moves. The system controller 50 stops moving the object when the above-mentioned interval reaches 2 seconds.

(8) Flip-Under-Gravity Manipulation (See FIGS. 9(b) and 9(c)).

A flip-under-gravity manipulation is conducted in such a way that an object, which is subjected to gravity, is flipped by a finger on the touch screen 11 and with a corresponding result on the display surface of the display unit 3.

FIG. 9(a) is a diagram illustrating, and FIG. 9(c) is a table explaining, a flip manipulation.

When the finger manipulation is a flip as in the above item (8) and the display information table 1T defines the object type as "gravity" meaning that the object is subjected to gravity, for example, the object moves while receiving a combination of the forces of inertia and gravity, as shown in FIG. 9(b). Therefore, the system controller 50 sends display update requests 4Q to the display controller 52, while updating the display position information left-top coordinates (X, Y) by adding a value to the Y-coordinate of the display information table 1T. The value is represented by 2 to the Nth power (N: the number of display update requests 4Q which are sent). In this case, too, the system controller 50 stops moving the object when the above-mentioned interval reaches 2 seconds.

Figures 10A, 10B:
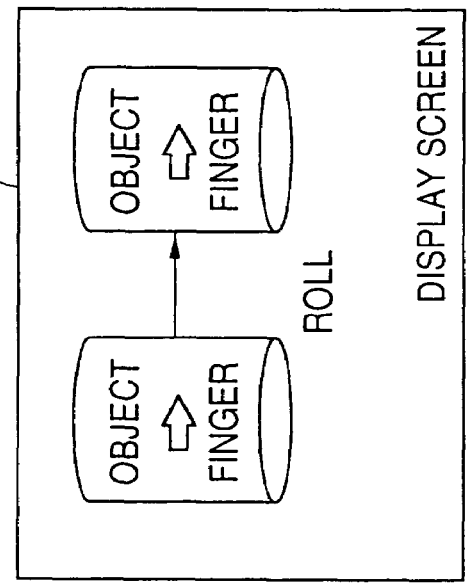
FIG. 10(a) is a diagram illustrating and FIG. 10(b) is a table explaining a roll manipulation.

(9) Roll Manipulation (See FIGS. 10(a) and 10(b)).

A roll manipulation is conducted in such a way that a rollable object is rolled by the operator's finger on the touch screen 11 and with a corresponding result on the display surface of the display unit 3.

FIG. 10(a) is a diagram illustrating, and FIG. 10(b) is a table explaining, a roll manipulation.

When a touch report 3R is input from the touch discriminator 51 and the display information table 1T defines the object type as "rollable", meaning that the object is constructed such that it rolls when pushed by a finger, like a globe or a cylinder and as shown in FIG. 10(a), the system controller 50 sends display update requests 4Q to the display controller 52, while updating the display position information left-top coordinates (X, Y) of the display information table 1T so that the object moves a distance 10 percent behind the distance moves on the display screen and in the direction the finger moves. The system controller 50 sends display update request 4Q to the display controller 52 until "continuous touch end" is reported from the touch discriminator 51.

(10) Distort-Restore Manipulation (See FIGS. 11(a) and 11(b)).

A distort-restore manipulation is conducted in such a way that an elastic object is pressed by a finger on the display surface of the display unit 3.

FIG. 11(a) is a diagram illustrating, and FIG. 11(b) is a table explaining, a distort-restore manipulation.

When a touch report 3R is input from the touch discriminator 51 and the display information table 1T defines the object type as "elastic", meaning that the object can be distorted and restored according to a pressure applied thereon by a finger and as shown in FIG. 11(a), the system controller 50 calculates an amount of distortion of the object based on the pressure reported by the touch report 3R. It stores in the display information table 1T, a special-state file name specifying a corresponding one of the special-state files (for displaying a distorted state of the object in a turn-over indication) corresponding to the amount of distortion calculated. Then, the system controller 50 sends a display update request 4Q to the display controller 52, commanding that the special-state file be displayed at the current display position. The above operation is repeated as necessary and when a "continuous touch end" is reported by a touch report 3R, the system controller 50 sends a display update request 4Q (with a normal display file name specified) to the display controller 52, commanding that a normal display file (normal indication) be displayed at the current display position. A plurality of special-state files are provided in the hard disk 7, corresponding to the amount of distortion of the object which results from the pressure applied on the touch screen 11.

As is apparent from the above description, the present invention regards a display screen as a visual space. It defines conditions and physical properties of an object (e.g., weight, hardness, frictional resistance, center of gravity) in the display information table 1T. It also receives touch screen information 2I, indicating a finger-touched position and pressure, as input from a touch screen unit 1. Based on the touch screen information 2I and the display information table 1T, the present invention determines a manipulation to be conducted on the displayed object, e.g, scrolling, picking, pushing, rolling, distorting the object on the display surface of the display unit 3. Thus, the present invention allows a user to manipulate an object displayed on a display device quite easily, even when the user has little knowledge of computers.

What is claimed is:

1. A method for simulating manipulation of an object utilizing a displayed image of the object, said method comprising the steps of:

sensing touching contact relative to the displayed image of the object, the touching contact simulating a manipulation of the object, and outputting touch information corresponding to the sensed touching contact and changes of the touching contact;

detecting, from the output touch information, characteristics of said touching contact including the selected location on the object image of the touching contact and changes of the touching contact and recognizing therefrom the corresponding object manipulation simulated thereby; and changing the display of the object image in accordance with the recognized, simulated manipulation of the object and object information for the displayed object image, including data relative to a type of the displayed object, specifying physical properties of the object.

2. A method according to claim 1, further comprising, in response to detected characteristics indicating that two touching contacts are located at opposite sides of the object image and move and stop with a distance therebetween:

controlling the display of the object image on the display device so that the object moves on a display surface of the display device from where the two touching contacts are located at opposite sides of the object image to where the two touching contacts stop with the distance therebetween.

3. A method according to claim 1, further comprising, in response to the detected characteristics indicating that the touching contact position is located at the object and moves while keeping in contact with the object and the object is sufficiently large relative to, and extends beyond, the display or only a portion of the object image is displayed on the display device:

controlling the display of the object by scrolling the object image while displaying same.

4. A method according to claim 3, further comprising in response to the detected characteristics indicating that a moving, touching contact stops moving:

controlling the display of the object image on the display device so that the scrolling of the object image stops on the display.

5. A method as recited in claim 1, further comprising storing information specifying a position of a portion of the object image being displayed on the display device, relative to the whole object image.

6. A method according to claim 1, further comprising, in response to the detected characteristics indicating that the touching contact is located at a geometric center or at a center of gravity of the object and moves and stops while maintaining contact with the object:

controlling the display of the object image so that the object image moves from where the touching contact is located at the geometric center or the center of gravity to where the moving, touching contact stops moving.

7. A method according to claim 1, further comprising in response to the detected characteristics indicating that the touching contact is located at a position off a geometric center or off a center of gravity of the object and moves and stops while maintaining contact with the object:

controlling the display of the object image so that the object image moves while rotating, from a position where the touching contact begins to a position where the touching contact stops.

8. A method according to claim 1, further comprising, in response to the detected characteristics indicating that the touching contact touches the object after moving in a direction toward the object, from a position apart therefrom and at a first speed higher than a predetermined speed:

controlling the display of the object so that the object image moves a distance in the direction and at a second speed proportional to the first speed with which the touching contact touches the object.

9. A method according to claim 1, further comprising, in response to the object information specifying the displayed object to be of a rollable type:

displaying the object image in a rolling condition.

10. A method according to claim 9, further comprising, in response to the detected characteristics indicating that the touching contact touches the object image:

moving and stopping while maintaining contact with the object, displaying the object image in a rolling condition.

11. A method according to claim 9, further comprising, in response to the detected characteristics indicating that the touching contact moves on the object while maintaining said touching contact with the object:

displaying the object image in a rolling condition and changing a positional relationship between the object image and the touching contact on the object image in accordance with the movement of the touching contact on the object.

12. A method according to claim 9, further comprising:

displaying the object image in a rolling condition so as to move the object image in a direction of the movement of the touching contact on the object.

13. A method according to claim 1, further comprising:

displaying the object image in a state of distortion and/or restoration, according to the object information specifying the displayed object to be of an elastic type.

14. A method according to claim 1, further comprising:

sensing an amount of pressure applied to the object image and, when the detected characteristic of the touching contact exceeds a specific amount of pressure, displaying the object image in a degree of distortion and/or restoration according to the amount of, and changes in, pressure of the touching contact.

15. An image display and manipulating method, comprising:

displaying an image of an object;

sensing touching contact relative to the displayed object image and outputting corresponding touch information;

detecting, from the received touch information, characteristics of the touching contact, the characteristics including the position on the object image of the input touching contact and changes of the position of the input touching contact; and changing the display of the object images in accordance with the characteristics and object information including an object type, which specifies physical properties of the object.

16. A method according to claim 15, further comprising detecting changes of the position of the input touching contact.

17. A method of manipulating a displayed image of an object, comprising:

displaying an image of the object;

detecting a position of touching contact relative to the object image and changes of the touching contact; and changing the display of the object image in accordance with detected characteristics and object information including at least an object type which specifies physical properties of the object and position information which specifies a position of the displayed object image.

18. A method according to claim 17, further comprising detecting changes of the touching contact.

19. A method of manipulating a displayed image of an object, comprising:

sensing characteristics of a touching contact relative to the displayed image of the object, the characteristics including at least a position of the touching contact and changes therein, and outputting corresponding touch information representing a simulated movement of the object responsive to the characteristics of the touching contact; and recognizing a type of manipulation of the object image in accordance with the information representing a simulated movement of the object and an object type specifying physical properties of the object and, correspondingly, manipulating and displaying the object image.

20. A method according to claim 19, further comprising sensing changes in the position of the touching contact.

21. A method as recited in claim 20, further comprising storing information specifying a position of a portion of the object being displayed, relative to the whole object.

22. A display method comprising:
   producing a display of an image of an object;
   sensing touching contact relative to the displayed object image, simulating an actual touching contact with an actual object corresponding to the displayed image of the object;
   detecting characteristics of the touching contact including a position of the touching contact relatively to the object image and changes of the position of the touching contact; and
   changing the display of the object in accordance with object information, specifying physical properties of the object, and the detected characteristics.

23. A method according to claim 22, further comprising detecting changes of the position of the touching contact.

24. A computer readable medium storing therein a computer program affording simulated manipulation of an object in accordance with an image of the object displayed on a display surface of a display device, said computer program comprising:
   a first function of responding to sensed touching contact relative to the displayed image of the object, simulating a manipulation of the object, and to changes in the touching contact for producing and outputting corresponding touch information;
   a second function of detecting, from the output touch information, characteristics of said touching contact including the selected location on the object image of the touching contact and changes of the touching contact and recognizing therefrom the corresponding object manipulation simulated thereby; and
   a third function of changing the display of the object image in accordance with the detected characteristics of the touching contact, the recognized, simulated manipulation of the object and object information for the displayed object image including data relative to a type of the displayed object specifying physical properties of the object.

25. A computer readable medium according to claim 24, wherein, in response to said second function detecting characteristics indicating that two touching contacts are located at opposite sides of the object image and, further, move and stop with a distance therebetween, said third function changes the display of the object image so that the object moves on a display surface of the display device from where the two touching contacts are located at opposite sides of the object image to where the two touching contacts stop with the distance therebetween.

26. A computer program product for controlling a computer, the program product comprising:
   a recording medium readable by the computer;
   means responsive to touching contact, and to changes in the touching contact, relative to an object displayed on a display surface of a display device, simulating manipulation of the object, for producing and outputting touch information corresponding to the sensed touching contact and representing the simulated manipulation of the object;
   first subroutine means, responsive to the output touch information, for detecting the characteristics of the touching contact and recognizing therefrom the corresponding object manipulation simulated thereby; and
   second subroutine means for changing the display of the object image in accordance with the detected characteristics of the touching contact, the recognized, simulated manipulation of the object and object information for the displayed object image including data relative to a type of the displayed object image specifying physical properties of the object.

27. An apparatus affording simulated manipulation of an object in accordance with an image of the object display surface of a displayed on a display device, comprising:
   a display device displaying an image of an object;
   an input device responsive to a touching contact relative to the displayed object image, the touching contact simulating a manipulation of the object, and outputting corresponding touch information;
   a storage unit storing a plurality of object information, each object information specifying a responsive manipulation type of each object; and
   a display controller changing the display of the object image in accordance with the touch information and the stored object information specifying a manipulation type of the object which specifies physical properties of the object.

28. An apparatus according to claim 27, wherein:
   said storage unit stores an object information specifying that the manipulation type is "rollable"; and
   in response to the touch information and said object information, said display controller displays the object image in a rolling condition.

29. An apparatus according to claim 27, wherein:
   said storage unit stores an object information specifying a manipulation type of "elastic"; and
   in response to the touch information and said object information, the display controller displays the object image in a distortion and/or restoration condition.

30. A method for simulating manipulation of an object using a displayed image of the object, comprising:
   displaying an image of an object;
   responding to a touching contact relative to the displayed object image, the touching contact simulating a manipulation of the object, and outputting corresponding touch information; and
   changing the display of the object image in accordance with the touch information and at least one of plural object information, each object information specifying a responsive manipulation type of the object which specifies physical properties of the object.

31. A method according to claim 30, wherein:
   said one of plural object information specifies that the manipulation type is "rollable"; and comprises
   in response to the touch information and said object information, displaying the object image in a rolling condition.

32. A method according to claim 30, wherein said one of plural object information specifies that the manipulation type is elastic, further comprising:

in response to the touch information and said object information, displaying the object image respectively in a distorted or a restored condition.

33. A storage medium storing a process displaying an image of an object by sensing touching contact relative to the displayed object image and outputting corresponding touch information; detecting, from the received touch information, characteristics of the touching contact, the characteristics including the position on the object image of the input touching contact and any changes of the position of the input touching contact; and changing the display of the object image in accordance with the characteristics and an object information including an object type, which specifies physical properties of the object.

34. A storage medium storing a process displaying an image of the object by detecting a position of touching contact relative to the object image and any changes of the touching contact and changing the display of the object image in accordance with the detected characteristics and object information including at least an object type which specifies physical properties of the object and position information which specifies a position of the displayed object image.

35. A storage medium storing a process displaying an image of an object by sensing characteristics of a touching contact relative to the displayed image of the object, the characteristics including at least a position of the touching contact and any changes therein, and outputting corresponding touch information representing a simulated movement of the object responsive to the characteristics of the touching contact; and recognizing a type of manipulation of the object image in accordance with the information representing a simulated movement of the object and an object type specifying physical properties of the object and, correspondingly, manipulating and displaying the object image.

36. A storage medium as recited in claim 35, storing information specifying a position of a portion of the object being displayed, relative to the whole object.

37. A storage medium producing a display of an image of an object by sensing touching contact relative to the displayed object image, simulating an actual touching contact with an actual object corresponding to the displayed image of the object; detecting characteristics of the touching contact including a position of the touching contact relatively to the object image and any changes of the position of the touching contact; and changing the display of the object in accordance with the object information specifying physical properties of the object, and the detected characteristics.

38. A computer readable medium storing therein a computer program affording simulated manipulation of an object using a displayed image of the object, said computer program comprising:
 a first function of responding to a touching contact relative to the displayed object image, the touching contact simulating a manipulation of the object, and outputting corresponding touch information; and
 a second function of changing the display of the object image in accordance with the touch information and at least one of plural object information, each said object information specifying a responsive manipulation type of the corresponding object which specifies physical properties of the object.

39. A controller for use with a display device to manipulate an object displayed on the display device and an input device responsive to a touching contact relative to the displayed object and simulating said manipulation, the input device producing corresponding touch information and the controller comprising:
 a detector detecting, from the touch information, characteristics of said touching contact including the selected location on the displayed object of the touching contact and changes of the touching contact and recognizing therefrom the corresponding object manipulation simulated thereby; and
 a display controller controlling to change the display of the object in accordance with the recognized, simulated manipulation of the object and object information for the displayed object, including data relative to a type of the displayed object which specifies physical properties of the object.

40. A controller for use with a display device to manipulate an object displayed on the display device and an input device responsive to a touching contact relative to the displayed object, the touching contact simulating said manipulation and the input device producing corresponding touch information; the controller comprising:
 a storage unit storing a plurality of object information, each object information specifying a responsive manipulation type of each object; and
 a display controller controlling to change the display of the object in accordance with the touch information and the stored object information specifying a manipulation type of the object which specifies physical properties of the object.

41. An apparatus for use with a display device to manipulate an object displayed on the display device, the apparatus comprising:
 an input device responding to a manipulation to the displayed object and producing corresponding input information, wherein
 said input device is responsive to a touching contact relative to the displayed object, the touching contact simulating said manipulation, and produces corresponding touch information;
 a storage unit storing object information specifying an object and its center of gravity;
 a display controller controlling to change the display of the object in accordance with the input information and the object information specifying physical properties of the object, wherein
 said display controller controls the display of the object in accordance with the touch information and the object information.

42. An apparatus according to claim 41, wherein, in response to touch information indicating a movement such that the touching contact touches the object at its center or its center of gravity, moves and stops while keeping in contact with the object, said display controller recognizes the movement as a push manipulation and controls the display of the object so that the object moves from where the touching touches the object to where the touching stops.

43. An apparatus according to claim 41, wherein in response to touch information indicating a movement such that the touching contact touches said object at a position off the center or the center of gravity thereof, moves and stops on said touch panel while keeping in contact with the object, said display controller controls the object on the display device so that the object moves while rotating from where the touching contact touches the object to where the touching contact stops.

44. An apparatus for use with a display device to manipulate an object displayed on the display device, the apparatus comprising:
- an input device inputting a manipulation to the displayed object and producing corresponding input information;
- a display controller controlling to change the display of the object on the display device so that the object moves on the display device from where two touches touch respective, opposite sides of the object to where the two touches stop, in accordance with the input information indicating a movement such that the two touches touch respective, opposite sides of the object and move.

45. An apparatus according to claim 44, wherein said input device is responsive to the two touches relative to the displayed object and simulating said manipulation, and outputs corresponding said input information; and
- the display controller controlling to change the display of the object on the display device so that the displayed object moves on the display device from where the two touches touch respective, opposite sides of the displayed object to where the two touches stop touching the object, in accordance with the touch information indicating a movement such that the two touches touch the respective, opposite sides of the object and move.

46. An apparatus of claim 45, further comprising:
- a storage unit storing position information which specifies the position where the object is displayed on the display device;
- wherein the display controller, in accordance with the touch information and display position information, recognizes a movement such that the two touches touch the respective, opposite sides of the object and move, and controls the object on the display device so that the object moves on the display device from where the two touching touch both sides of the object to where the two touching stop.

47. A controller for use with a display device to manipulate an object displayed on the display device and an input device inputting a manipulation to the displayed object and producing corresponding input information, the controller comprising:
- a display controller controlling to change the display of the object on the display device so that the object moves on the display device from where two touches touch respective, opposite sides of the object to where the two touches stop such touching, in accordance with the input information indicating a movement such that the two touches touch the respective, opposite sides of the object and move.

48. A method for simulating manipulation of a displayed object, comprising:
- displaying an object;
- responding to a manipulation to the displayed object at an input device which produces corresponding input information;
- controlling to change the display of the object on the display device so that the object moves on the display device from where two touches touch the respective, opposite sides of the object to where the two touches stop such touching, in accordance with the input information indicating a movement such that the two touches touch the respective, opposite sides of the object and move.

49. A computer readable medium storing therein a computer program affording simulated manipulation of displayed object, said computer program comprising:
- a first function of responding to a manipulation to the displayed object at an input device which produces corresponding input information;
- a second function of controlling to change the display of the object on the display device so that the object moves on the display device from where two touches touch the respective, opposite sides of the object to where the two touches stop such touching, in accordance with the input information indicating a movement such that the two touches touch the respective, opposite sides of the object and move.

50. An apparatus for use with a display device to manipulate an object displayed on the display device, the apparatus comprising:
- an input device responsive to a touching contact, relative to the displayed object, and producing corresponding input information;
- a storage unit storing object information about a large object extending beyond a display area of the display device; and
- a display controller, in accordance with the object information and the input information indicating a movement such that the touching contact moves a distance more than a predetermined distance or the touching contact moves at a speed higher than a predetermined speed, controlling to display the object on the display device in a scroll condition.

51. An apparatus according to claim 50, wherein said display controller controls to start the scroll condition at a first speed and gradually decreases the scroll condition to a second, lower speed.

52. An apparatus according to claim 51, wherein said first speed of the scroll condition depends on said speed at which, or said distance at once which, said touching contact moves.

53. An apparatus according to claim 50, wherein said display controller controls to decrease the speed of the scroll condition in a case where another touching contact does not occur.

54. An apparatus according to claim 51, wherein said display controller controls to continue the scroll condition in a case where another touching contact occurs before the scroll condition steps.

55. An apparatus according to claim 50, wherein said display controller controls to stop the scroll condition in a case where the touching contact stops in the scroll condition of the displayed object.

56. A controller for use with a display device to manipulate an object displayed on the display device and an input device responsive to a touching contact relative to the displayed object and producing corresponding input information, the controller comprising:
- a storage unit storing object information about a large object extending beyond a display area of the display device; and
- a display controller, in accordance with the object information and the input information indicating a movement, controlling to display the object on the display device in a scroll condition, such that the touching contact moves a distance more than a predetermined distance or the touching contact moves at a speed higher than a predetermined speed.

57. A method for simulating manipulation of a displayed object, comprising:
- displaying a part of an object which extends beyond a display area;

responding to a touching contact to the displayed object, at an input device responsive to a touching contact to the displayed object and producing corresponding input information; and controlling to display the object on the display device in a scroll condition, in accordance with the input information indicating a movement such that the touching contact moves a distance more than a predetermined distance or the touching contact moves at a speed higher than a predetermined speed.

58. A computer readable medium storing therein a computer program affording simulated manipulation of displayed object, said computer program comprising:

a first function of responding a manipulation to a displayed object from an input device responsive to a touching contact relative to the displayed object and producing corresponding input information, said displayed object extending beyond a display area; and a second function of controlling to display the object on the display device in scroll condition, in accordance with the input information indicating a movement such that the touching contact moves a distance more than a predetermined distance or the touching contact moves at a speed higher than a predetermined speed.

59. An apparatus controlling a display of an object in accordance with a simulated manipulation of the object produced by a corresponding touching contact on an input device, relative to the displayed object, the input device producing corresponding touch information and the apparatus comprising:

a detector detecting, from the touch information, characteristics of said touching contact including the selected location on the displayed object of the touching contact and changes of the touching contact and recognizing therefrom the corresponding object manipulation simulated thereby; and a display controller controlling to change the display of the object in accordance with the recognized, simulated manipulation of the object and object information for the displayed object, including data relative to a type of the displayed object, which specifies physical properties of the object.

60. An apparatus controlling a display of an object in accordance with a simulated, selected manipulation of the object produced by corresponding touching contact on an input device, relative to the displayed object, the input device outputting corresponding touch information and the apparatus comprising:

a storage unit storing a plurality of object information, each object information specifying a responsive manipulation type of each object; and a display controller controlling to change the display of the object in accordance with the touch information and stored object information specifying a manipulation type of the object, which specifies physical properties of the object.

* * * * *

UNITED STATES PATENT AND TRADEMARK OFFICE
CERTIFICATE OF CORRECTION

| | | |
|---|---|---|
| PATENT NO. | : 7,345,675 B1 | |
| APPLICATION NO. | : 09/149216 | |
| DATED | : March 18, 2008 | |
| INVENTOR(S) | : Yu Minakuchi et al. | |

It is certified that error appears in the above-identified patent and that said Letters Patent is hereby corrected as shown below:

In column 3, line 38, delete "table;" and insert -- table. --, therefor.

Signed and Sealed this
Eighth Day of November, 2011

David J. Kappos
*Director of the United States Patent and Trademark Office*